R. R. MORGAN & W. H. CORDER.
HORSE DETACHER.
APPLICATION FILED NOV. 24, 1911.
1,079,792. Patented Nov. 25, 1913.
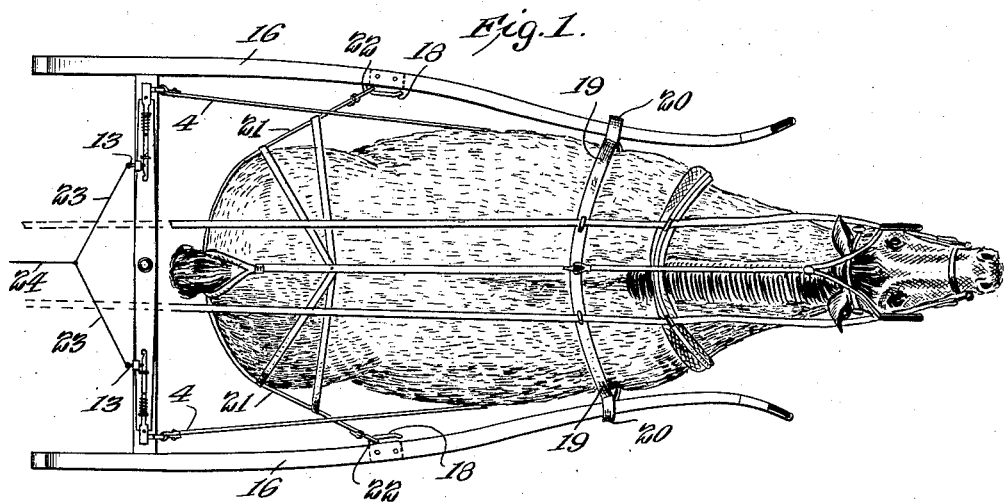
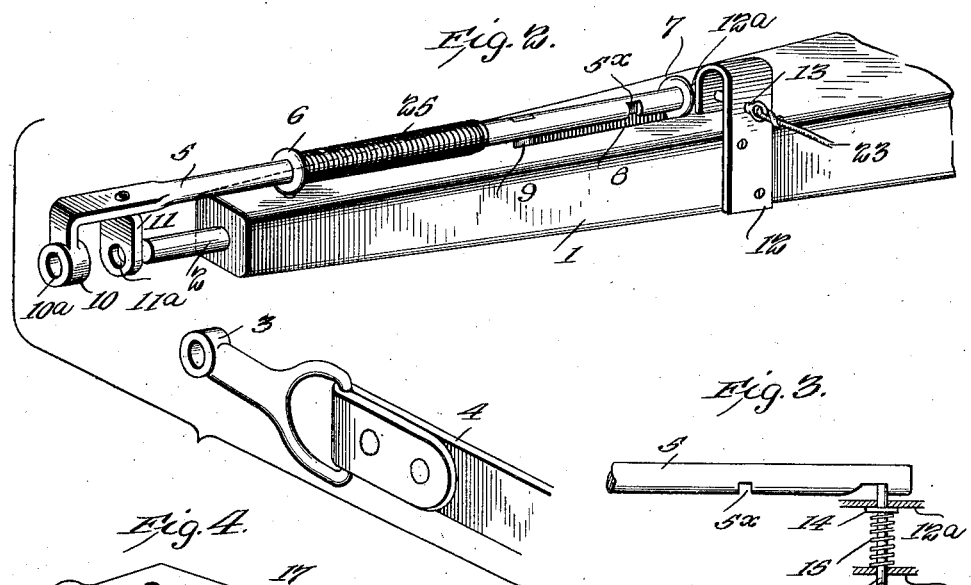
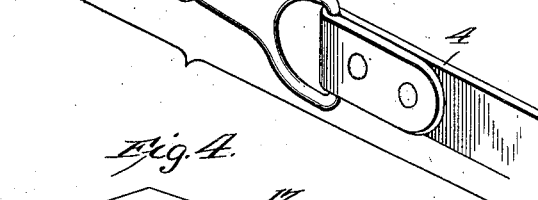
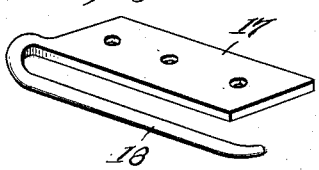
WITNESSES
INVENTORS
ROBERT R. MORGAN
WILLIAM H. CORDER
BY
ATTORNEYS

UNITED STATES PATENT OFFICE.

ROBERT RALPH MORGAN AND WILIAM HAMILTON CORDER, OF NORTH CARROLLTON, MISSISSIPPI.

HORSE-DETACHER.

1,079,792.  Specification of Letters Patent.  Patented Nov. 25, 1913.

Application filed November 24, 1911. Serial No. 662,133.

*To all whom it may concern:*

Be it known that we, ROBERT R. MORGAN and WILIAM H. CORDER, citizens of the United States, and residents of North Carrollton, in the county of Carroll and State of Mississippi, have made certain new and useful Improvements in Horse-Detachers, of which the following is a specification.

Our invention relates to improvements in means for detaching horses from vehicles, and it consists in the combinations, constructions, and arrangements herein described and claimed.

An object of our invention is to provide means whereby a horse which is harnessed to a vehicle may be liberated therefrom, said means consisting in a device for detaching the traces, the hold-back, and the belly-band, thus permitting the horse to emerge from between the shafts clear of the vehicle.

Other objects and advantages will appear in the following specification and the novel features of the device will be particularly pointed out in the appended claims.

Our invention is illustrated in the accompanying drawings forming part of this application in which similar reference characters indicate like parts in the several views, and in which—

Figure 1 is a view showing our device as applied to a horse and vehicle, Fig. 2 is a detail perspective view of the trace detaching means, Fig. 3 is a detail view partly in section showing the spring catch on the whiffletree, Fig. 4 is a perspective view of one of the hold-back plates, and Fig. 5 is a view of one of the belly-band rings.

Referring now particularly to Fig. 2, it will be seen that we have provided the whiffletree 1 with a pin 2 at the end, which is designed to pass through the eye 3, which with the leather member 4, forms the tug or trace.

A rod 5 is arranged to extend through an eye 6 at one end of the whiffletree, and through an eye 7 in a slot 8. The rod is provided with a laterally extending arm 9 arranged to extend into the slot 8 for the purpose of limiting the movement of the rod. One end of the rod is fashioned into a U-shaped yoke whose arms 10 and 11 have registering openings $10^a$ and $11^a$, arranged to receive the pin 2. The space between the arms 10 and 11 is sufficient to receive the eye 3. At one side of the whiffletree is secured a plate 12 whose upper end is bent laterally and downwardly, as shown in Fig. 2 to form an opposing plate $12^a$. A pin 13 having a plate 14 is arranged to pass through the plate 12, and its integral plate $12^a$, said pin being normally under the tension of a spring 15. The end of the pin is adapted to enter the notch $5^x$ in the rod 5, as will be explained later.

To the under side of each shaft 16 we secure a plate 17 having a hook member 18, the open end of the hook being turned toward the open end of the shaft. To the belly-band 19, we attach metal rings 20 of the form shown in Fig. 5, these rings being arranged to slip laterally over the ends of the shaft 16. The hold-back straps 21 are attached to the rings 22 which slip loosely over the hooks 18, as clearly shown in Fig. 1.

From the foregoing description of the various parts of the device, the operation thereof may be readily understood. Each end of the whiffletree is equipped in the manner described as shown in Fig. 1, and to each of the pins 13 is secured a cord 23, these cords 23 being joined to a common cord 24, which may be within easy reach of the occupant of the vehicle. The traces are attached by placing the eye 3 in alinement with the openings $10^a$ and $11^a$ and pushing the yoke inwardly so as to cause the pin 2 to enter the alined openings $10^a$, 3 and $11^a$. The movement of the rod is opposed by a spring 25 which is secured to the eye 6 at one end and to the rod 5 at the other. The tension of the spring 25 tends to force the rod outwardly, but it is kept from movement by the engagement of the pin 13 in the slot $5^x$. The hold-back rings 22 are slipped over their hooks 18, and the rings 20 are slipped over the ends of the shafts. Now if the horse should become frightened suddenly and start to run, a pull on the cord 24 will cause the withdrawal of both of the pins 13 at the ends of the whiffletree and the rods 5 will be forced outwardly by their springs 25, thereby forcing the eye 3 off from the pins 2 and freeing the traces. The horse will now be permitted to run out of the shafts without hindrance, because the hold-back rings 22 will slip off from the hooks 18, and the metal rings 20 will slip over the ends of the shaft 16. The horse will thus be completely detached from the vehicle at a single movement, *i. e.*, the pulling of the cord 24.

We are aware that devices have been made for detaching traces, also that devices have been made for permitting the detachment of the hold-backs, and we do not claim such. Our invention lies in providing means for positively permitting the complete detachment of the horse from the vehicle, and it is necessary as far as our apparatus is concerned that the traces, hold-backs, and the belly-band be absolutely detached from the vehicle.

We claim:—

1. In a device for detaching horses from vehicles, a whiffletree, each end of the whiffletree being provided with an outwardly extending pin, a rod having a notch at one end to said rod, a bracket, and a spring yoke at the other, the arms of said yoke being perforated to receive the pin, a pair of screw eyes carried by said whiffletree and arranged to receive said rod, a spring arranged to bear at one end on one of said screw eyes and being secured at the other end to said rod, a bracket, and a spring pressed trigger carried by said bracket and arranged to enter the notch in said rod for holding the yoke upon the pin, the withdrawal of said spring pressed trigger permitting the yoke to be forced off from the end of the pin.

2. In a device for detaching horses from vehicles, a whiffletree, each end of the whiffletree being provided with an outwardly extending pin, a rod having a notch at one end and being provided with a U-shaped yoke at the other, the arms of said yoke being perforated to receive the pin, a trace provided with an eye arranged to receive the pin, said eye being adapted to enter between the arms of the yoke, a pair of screw eyes carried by said whiffletree and arranged to receive said rod, a spring arranged to bear at one end on one of said screw eyes and being secured at the other end to said rod, a bracket, and a spring pressed trigger carried by said bracket and arranged to enter the notch in said rod for holding the yoke upon the pin, the withdrawal of said spring pressed trigger permitting the yoke to be forced off from the end of the pin, thereby freeing the trace eye from the whiffletree.

ROBERT RALPH MORGAN.
WILIAM HAMILTON CORDER.

Witnesses:
C. V. McDougal,
W. B. Vance.

---

Copies of this patent may be obtained for five cents each, by addressing the "Commissioner of Patents, Washington, D. C."